July 14, 1925.
R. E. FLANDERS
METHOD OF MAKING CHASERS
Filed June 15, 1923
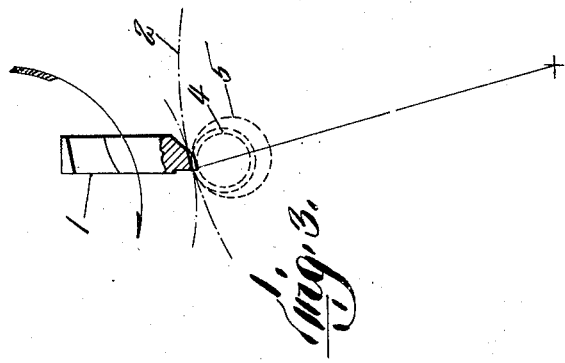
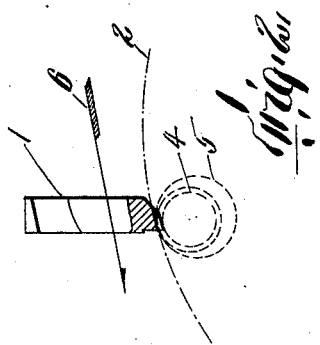
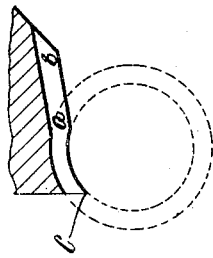
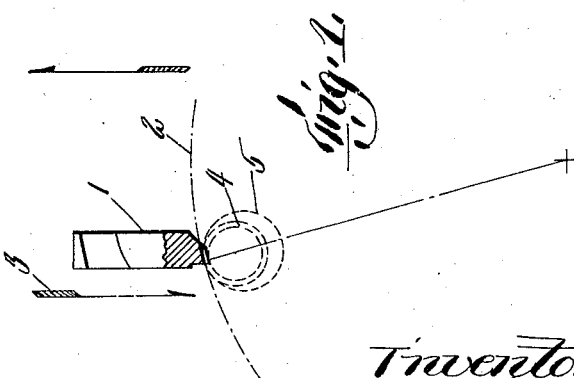
Inventor
Ralph E. Flanders Patented July 14, 1925.

1,545,749

UNITED STATES PATENT OFFICE.

RALPH E. FLANDERS, OF SPRINGFIELD, VERMONT, ASSIGNOR TO JONES & LAMSON MACHINE COMPANY, OF SPRINGFIELD, VERMONT, A CORPORATION OF VERMONT.

METHOD OF MAKING CHASERS.

Application filed June 15, 1923. Serial No. 645,514.

*To all whom it may concern:*

Be it known that I, RALPH E. FLANDERS, a citizen of the United States, residing at Springfield, in the county of Windsor and State of Vermont, have invented new and useful Improvements in a Method of Making Chasers, of which the following is a specification.

This invention relates to a method of making chasers such as are used in the thread-cutting dies of automatic lathes, screw machines, and the like, and relates more particularly to the method of forming and finishing the threads thereof.

For such chasers it is desirable to employ what is commonly known as high speed steel in order that the cutting of the threads may be as speedily effected as possible. To obtain the full cutting power of such steel it is necessary to heat it to about 2300° Fahrenheit at which temperature the points of the threads of taps, chasers or other threaded articles begin to melt thus ruining the shape of the cutting edge. For this reason it has been customary to harden high speed steel taps and chasers below the proper heat so that the full advantage of the material has not been obtained. When the threads are to be ground after the hardening it may be treated at the desirable high temperature, but as chaser threads are concave, it is not commercially practicable to grind them to their final form since in most cases this would require grinding wheels of smaller than commercial diameters. In order to bring chaser threads to the required concave form, lapping might be resorted to, but this is a very slow process and could not be used commercially to remove the large inaccuracy of threads so badly out of form as would result from hardening the chasers at the desirable high temperature.

This invention, therefore, relates to a commercial method of making chasers, whereby they may be finished to the proper contour and yet be hardened at the desirable high temperature. According to this invention the chasers have their threads cut in any suitable manner and they are then hardened at the desirable high temperature, the contour of the threads being badly misshapen thereby. Next the chasers are ground either straight across by traversing them lengthwise of the threads relative to a grinding wheel or to the concavity produced by presenting them directly to the grinding wheel, or slightly convexed by mounting them on a mandrel outwardly extending and rotating the mandrel in proximity to the edge of the grinding wheel. This serves to remove the large inaccuracies produced by the heat treatment and reduces the threads to the proper cross-section, but they are still insufficiently accurate to obtain a proper bearing on the work. The grinding operation is only a roughing process. The chasers are then lapped to accurate finished form, the material which it is necessary to remove thereby being so small in amount that lapping is a commercial process.

For a more complete understanding of this invention reference may be had to the accompanying drawings in which Figure 1 is a diagrammatic view illustrating the grinding and lapping action where the threads are given the concavity corresponding to the convexity of the wheel, the relative diameters of the wheel, work and lap being indicated as well as the relative positions of the wheel and lap with relation to the threads of the chaser;

Figs. 2 and 3 are similar views illustrating the grinding operation so formed as to make straight and convex threads, respectively; and Fig. 4 is an enlarged and exaggerated diagrammatic view illustrating the relations of the lapped finished surface to threads which are ground straight as in Fig. 2.

Referring first to Fig. 1, the chaser is indicated at 1 having had threads cut therein while it is in comparatively soft and workable condition, and then having been hardened by heating to a temperature sufficient to obtain the best results, but which is also sufficient to spoil the contour of the teeth. The chaser is then presented to a grinding wheel, the periphery of which is indicated by the dot and dash line at 2. This is of comparatively large diameter, it not being commercially practicable to form such wheels smaller than at least three inches in diameter. This, however, is much larger than the work for which these chasers are intended. The threads may be ground somewhat concave by presenting the chaser to the edge of the wheel in a substantially direct line as indicated by the arrow 3 so that no turning action of the chaser relative to the wheel is permitted. The diameter of the work on which the chaser is to operate is indicated by the concentric dotted circles at 4, the size of the chaser being much enlarged in this view for the sake of clearness. This grinding operation serves to remove the large irregularities and inaccuracies of the threads caused by the high heat treatment, but since the diameters of the wheel and the work are so different, does not form the teeth so that they will properly bear upon the work.

When this grinding has been completed, the contours of the threads adjacent to their cutting edges are formed more accurately to define a proper bearing on the work by means of a lap, the size of which is indicated by the dotted circle 5 which is only a little larger than that of the work. This lapping operation takes off only a few ten thousandths of an inch and acts on work which has already been cut by the grinding wheel. The lap is therefore not required to cut under the rough scale and remove major inaccuracies resulting from the heat treatment which would be very slow and destructive to the lap. The laps which are used are preferably formed of some soft material such as soft steel threaded and charged with emery and revolved under pressure in contact with the threads of the chaser in such a way as to remove enough material to give the desired bearing without injuring the lap or tearing out the emery particles which are charged into its body.

In Figure 2 the same construction is illustrated except that in this case the chaser is given a traversing movement relative to the grinding wheel as shown by the arrow 6 which causes the threads as ground to be flat lengthwise. Where the chasers are so ground the action of the lap thereon is indicated in a much exaggerated form in Figure 4 where it will be noted that the portion of the thread from *a* to *b* is flat as it leaves the grinding wheel, while the forward portion adjacent to the cutting edge at *c* and between the points *a* and *c* is concave to fit the convexity of the lap. This portion from *a* to *c* is the portion which bears on the work.

In Fig. 3 is shown the construction wherein the chaser is rotated while in contact with the wheel in which case the threads are left convex lengthwise by the grinding operation. This convexity, however, should be comparatively slight and only slightly more lapping is necessary to bring the chasers to a proper bearing on the work than when the threads are ground flat as shown in Figs. 2 and 4 or concave as shown in Fig. 1.

Having thus described certain embodiments of this invention, it should be evident that various changes and modifications may be made therein without departing from its spirit or scope as defined by the appended claims.

I claim:

1. The method of making a chaser from high speed steel, which comprises forming and cutting the threads of the chaser from the unhardened material, subjecting the cut chasers to a temperature sufficiently high to cause partial melting of the points of the threads to harden the material, grinding the threads to approximate form, and then lapping the threads to a proper bearing on the work.

2. The method of making a chaser from high speed steel, which comprises forming and cutting the threads of the chaser from unhardened material, subjecting the cut chasers to a temperature sufficiently high to cause partial melting of the points of the threads to harden the material, reducing the threads to approximate form, and then lapping the threads to a proper bearing on the work.

3. The method of making a chaser, which comprises cutting the chaser from unhardened material, hardening the material by a method producing distortion of the threads of the chaser, grinding the threads to approximately the desired form, and then lapping the threads to shape to bear properly on the work.

4. The method of finishing a chaser, which comprises grinding the threads of the hardened chaser to approximately correct form and then lapping the ground threads to final form in which they bear properly on the work.

5. The method of finishing a chaser, which comprises grinding the hardened threads thereof throughout their length to proper cross-section, and then lapping the portions of said threads adjacent to their cutting edges to proper form to bear correctly on the work.

6. The method of finishing a chaser, which comprises effecting a roughing cut throughout the length of the threads of the hardened chaser, and then effecting a finishing cut on the portions of the threads adjacent to their cutting edges to properly form them to bear correctly on the work.

In testimony whereof I have affixed my signature.

RALPH E. FLANDERS.